US007791027B2

(12) United States Patent
McAllister et al.

(10) Patent No.: US 7,791,027 B2
(45) Date of Patent: Sep. 7, 2010

(54) APPARATUS AND METHOD PROVIDING A HAND-HELD SPECTROMETER

(75) Inventors: Abraham McAllister, Annandale, VA (US); Malcolm Smith, Winchester, MA (US); Kostas Zafiriou, Somerville, MA (US); David Day, Boxford, MA (US); Michael Butler, Windham, NH (US)

(73) Assignee: Ahura Scientific Inc., Wilmington, MA (US)

( * ) Notice: Subject to any disclaimer, the term of this patent is extended or adjusted under 35 U.S.C. 154(b) by 0 days.

(21) Appl. No.: 12/631,574

(22) Filed: Dec. 4, 2009

(65) Prior Publication Data

US 2010/0078564 A1    Apr. 1, 2010

Related U.S. Application Data

(63) Continuation of application No. 11/669,678, filed on Jan. 31, 2007, now abandoned.

(60) Provisional application No. 60/763,824, filed on Jan. 31, 2006.

(51) Int. Cl.
*G01J 5/02* (2006.01)
(52) U.S. Cl. .................................. 250/339.07
(58) Field of Classification Search ................................
250/339.01–339.15
See application file for complete search history.

(56) References Cited

U.S. PATENT DOCUMENTS 3,183,438 A    5/1965   Hirsch
3,553,364 A    1/1971   Lee
3,947,105 A    3/1976   Smith
4,009,939 A    3/1977   Okano
4,017,158 A    4/1977   Booth
4,067,129 A    1/1978   Abramson et al.
4,093,346 A    6/1978   Nishino et al.
4,139,257 A    2/1979   Matsumoto
4,163,570 A    8/1979   Greenaway (Continued)

FOREIGN PATENT DOCUMENTS

EP    0968453 B1    1/2002

(Continued)

OTHER PUBLICATIONS

Manzardo et al., "Infrared MEMS-based Lamellar Grating Spectrometer," 2004, SPIE Proceedings, vol. 5455, pp. 1-8.*

(Continued)

*Primary Examiner*—David P Porta
*Assistant Examiner*—Kiho Kim
(74) *Attorney, Agent, or Firm*—Lando & Anastasi, LLP

(57) ABSTRACT

According to one aspect, an IR spectrometer includes a light source adapted to illuminate a sample, a grating adapted to spectrally disperse a light that has illuminated the sample, a MEMS array adapted to be electrostatically actuated by a controller to control a diffraction of the light, a detector configured to detect the light, and a power source adapted to supply power to the light source and to the MEMS array, wherein the controller is adapted to control the MEMS array so as to manage a power consumption of the IR spectrometer. In one embodiment, the IR spectrometer includes a housing sized and arranged to house the light source, the grating, the MEMS array, the controller, the detector, to and the power source in a hand-held device.

20 Claims, 9 Drawing Sheets

U.S. PATENT DOCUMENTS

| | | | |
|---|---|---|---|
| 4,184,700 A | 1/1980 | Greenaway |
| 4,211,918 A | 7/1980 | Nyfeler et al. |
| 4,223,050 A | 9/1980 | Nyfeler et al. |
| 4,234,788 A | 11/1980 | Palmer et al. |
| 4,250,217 A | 2/1981 | Greenaway |
| 4,250,393 A | 2/1981 | Greenaway |
| 4,408,884 A | 10/1983 | Kleinknecht et al. |
| 4,440,839 A | 4/1984 | Mottier |
| 4,492,435 A | 1/1985 | Banton et al. |
| 4,556,378 A | 12/1985 | Nyfeler et al. |
| 4,596,992 A | 6/1986 | Hornbeck |
| 4,655,539 A | 4/1987 | Caulfield et al. |
| 4,731,670 A | 3/1988 | Allen et al. |
| 4,751,509 A | 6/1988 | Kubota et al. |
| 4,761,253 A | 8/1988 | Antes |
| 4,805,038 A | 2/1989 | Seligson |
| 4,856,869 A | 8/1989 | Sakata et al. |
| 4,915,463 A | 4/1990 | Barbee, Jr. |
| 4,984,824 A | 1/1991 | Antes et al. |
| 5,022,745 A | 6/1991 | Zayhowski et al. |
| 5,035,473 A | 7/1991 | Kuwayama et al. |
| 5,058,992 A | 10/1991 | Takahashi |
| 5,089,903 A | 2/1992 | Kuwayama et al. |
| 5,101,184 A | 3/1992 | Antes |
| 5,115,344 A | 5/1992 | Jaskie |
| 5,132,812 A | 7/1992 | Takahashi et al. |
| 5,155,604 A | 10/1992 | Miekka et al. |
| 5,164,688 A | 11/1992 | Larson |
| 5,168,249 A | 12/1992 | Larson |
| 5,175,521 A | 12/1992 | Larson |
| 5,202,785 A | 4/1993 | Nelson |
| 5,206,557 A | 4/1993 | Bobbio |
| 5,212,582 A | 5/1993 | Nelson |
| 5,231,388 A | 7/1993 | Stolz |
| 5,233,456 A | 8/1993 | Nelson |
| 5,291,317 A | 3/1994 | Newswanger |
| 5,291,502 A | 3/1994 | Pezeshki et al. |
| 5,301,062 A | 4/1994 | Takahashi et al. |
| 5,311,360 A | 5/1994 | Bloom et al. |
| 5,347,433 A | 9/1994 | Sedlmayr |
| 5,353,641 A | 10/1994 | Tang |
| 5,363,220 A | 11/1994 | Kuwayama et al. |
| 5,367,585 A | 11/1994 | Ghezzo et al. |
| 5,392,151 A | 2/1995 | Nelson |
| 5,396,066 A | 3/1995 | Ikeda et al. |
| 5,459,610 A | 10/1995 | Bloom et al. |
| 5,500,761 A | 3/1996 | Goossen et al. |
| 5,561,523 A | 10/1996 | Blomberg et al. |
| 5,629,951 A | 5/1997 | Chang-Hasnain et al. |
| 5,640,133 A | 6/1997 | MacDonald et al. |
| 5,646,772 A | 7/1997 | Yurke |
| 5,654,819 A | 8/1997 | Goossen et al. |
| 5,661,592 A | 8/1997 | Bornstein |
| 5,677,783 A | 10/1997 | Bloom et al. |
| 5,696,662 A | 12/1997 | Bauhahn |
| 5,739,945 A | 4/1998 | Tayebati |
| 5,745,271 A | 4/1998 | Ford et al. |
| 5,757,536 A | 5/1998 | Ricco et al. |
| 5,781,670 A | 7/1998 | Deacon et al. |
| 5,794,023 A | 8/1998 | Hobbs et al. |
| 5,808,797 A | 9/1998 | Bloom et al. |
| 5,836,203 A | 11/1998 | Martin et al. |
| 5,841,579 A | 11/1998 | Bloom et al. |
| 5,847,859 A | 12/1998 | Murata |
| 5,870,221 A | 2/1999 | Goossen |
| 5,905,571 A | 5/1999 | Butler et al. |
| 5,905,589 A | 5/1999 | Tanaka et al. |
| 5,920,418 A | 7/1999 | Shiono et al. |
| 5,933,277 A | 8/1999 | Troxell et al. |
| 5,949,568 A | 9/1999 | Koo et al. |
| 5,949,570 A | 9/1999 | Shiono et al. |
| 5,953,161 A | 9/1999 | Troxell et al. |
| 5,966,235 A | 10/1999 | Walker |
| 5,969,848 A | 10/1999 | Lee et al. |
| 5,978,127 A | 11/1999 | Berg |
| 5,991,079 A | 11/1999 | Furiani et al. |
| 5,998,906 A | 12/1999 | Jerman et al. |
| 5,999,319 A | 12/1999 | Castracane |
| 6,004,912 A | 12/1999 | Gudeman |
| 6,014,257 A | 1/2000 | Furlani et al. |
| 6,031,233 A | 2/2000 | Levin |
| 6,031,652 A | 2/2000 | Furlani et al. |
| 6,038,057 A | 3/2000 | Brazas, Jr. et al. |
| 6,061,166 A | 5/2000 | Furlani et al. |
| 6,067,183 A | 5/2000 | Furlani et al. |
| 6,072,620 A | 6/2000 | Shiono et al. |
| 6,088,148 A | 7/2000 | Furlani et al. |
| 6,100,463 A | 8/2000 | Ladd et al. |
| 6,108,117 A | 8/2000 | Furlani et al. |
| 6,130,770 A | 10/2000 | Bloom |
| 6,141,139 A | 10/2000 | Furlani et al. |
| 6,144,481 A | 11/2000 | Kowarz et al. |
| 6,147,350 A | 11/2000 | Beecroft et al. |
| 6,169,624 B1 | 1/2001 | Godil et al. |
| 6,172,796 B1 | 1/2001 | Kowarz et al. |
| 6,175,443 B1 | 1/2001 | Aksyuk et al. |
| 6,181,458 B1 | 1/2001 | Brazas, Jr. et al. |
| 6,188,519 B1 | 2/2001 | Johnson |
| 6,215,579 B1 | 4/2001 | Bloom et al. |
| 6,233,087 B1 | 5/2001 | Hawkins et al. |
| 6,238,581 B1 | 5/2001 | Hawkins et al. |
| 6,243,194 B1 | 6/2001 | Brazas, Jr. et al. |
| 6,251,842 B1 | 6/2001 | Gudeman |
| 6,252,697 B1 | 6/2001 | Hawkins et al. |
| 6,268,952 B1 | 7/2001 | Godil et al. |
| 6,282,012 B1 | 8/2001 | Kowarz et al. |
| 6,282,213 B1 | 8/2001 | Gutin et al. |
| 6,284,560 B1 | 9/2001 | Jech, Jr. et al. |
| 6,288,824 B1 | 9/2001 | Kastalsky |
| 6,329,738 B1 | 12/2001 | Hung et al. |
| 6,507,706 B1 | 1/2003 | Brazas et al. |
| 6,630,663 B2 | 10/2003 | Murphy et al. |
| 6,724,125 B2 | 4/2004 | Hung et al. |
| 6,791,735 B2 | 9/2004 | Stappaerts |
| 6,904,191 B2 | 6/2005 | Kubby |
| 6,912,235 B2 | 6/2005 | Anthon et al. |
| 6,940,629 B2 | 9/2005 | Gurcan |
| 6,996,306 B2 | 2/2006 | Chen et al. |
| 7,087,901 B2 | 8/2006 | Ambuel |
| 7,297,934 B2 | 11/2007 | Kane |
| 7,494,065 B2 | 2/2009 | Barkan et al. |
| 7,634,325 B2 | 12/2009 | Wang et al. |
| 2001/0043194 A1 | 11/2001 | Amron |
| 2002/0105725 A1 | 8/2002 | Sweatt |
| 2004/0218172 A1 | 11/2004 | Deverse et al. |
| 2004/0239894 A1 | 12/2004 | Shimada |
| 2005/0083523 A1 | 4/2005 | Senturia |
| 2005/0229698 A1 | 10/2005 | Beecroft |
| 2007/0040637 A1 | 2/2007 | Yee et al. |
| 2007/0159635 A1 | 7/2007 | Urey et al. |

FOREIGN PATENT DOCUMENTS

| | | |
|---|---|---|
| EP | 1014143 B1 | 5/2002 |
| EP | 1143287 B1 | 5/2006 |
| EP | 1122577 B1 | 8/2006 |
| JP | 08292147 | 11/1996 |
| WO | 9102991 A1 | 3/1991 |
| WO | 9841893 A1 | 9/1998 |
| WO | 0111394 A1 | 2/2001 |
| WO | 0111396 A1 | 2/2001 |
| WO | 0111410 A1 | 2/2001 |
| WO | 0111419 A3 | 2/2001 |

| | | | |
|---|---|---|---|
| WO | 0142825 A1 | 6/2001 | |

OTHER PUBLICATIONS

Sagberg et al., 'Micromechanical gratings for visible and near-infrared spectroscopy, 2004, IEEE Journal of Selected Topics in Quantum Electronics, vol. 10, No. 3, pp. 604-613.*

Day et al., "Diffractive-MEMS implementation of a hadamard near-infrared spectrometer," 2005, IEEE, The 13th International Conference on Solid-State Sensors, Actuators, and Microsystems, Seoul, Korea, pp. 1246-1249.*

Apte, Raj B. et al., "Deformable Grating Light Valves for High Resolution Displays", Solid-State Sensor and Actuator Workshop, Jun. 13-16, 1994.

Aratani, K., "Process and Design Considerations for Surface Micromachined Beams For a Tuneable Interferometer Array in Silicon", IEEE 1993.

Bifano, Thomas G. et al., "Continuous-Membrane Surface-Micromachined Silicon Deformable Mirror", Society of Photo-Optical Instrumentation Engineers, 1997.

Perreault, Julie et al., "MEMS Deformable Mirrors for Adaptive Optics", Solid-State Sensor and Actuator Workshop, Jun. 8-11, 1998.

Bifano, Thomas G. et al., "Microelectromechanical Deformable Mirrors", IEEE 1999.

Burns, D. M. et al., "Designs to Improve Polysilicon Micromirror Surface Topology", SPIE 1997.

Burns, David M. et al., "Development of Microelectromechanical Variable Blaze Gratings," Elsevier Science, 1998.

David M. Burns et al., "Investigation of the Maximum Optical Power Rating for a Micro-Electro-Mechanical Device,", Conference on Solid-State Sensor and Actuator, Jun. 16-19, 1997.

Burns, D.M., "Micro-Electro-Mechanical Variable Blaze Gratings", Micro Electro Mechanical Systems, 1997, IEEE, Tenth Annual International Workshop, vol. issue, Jan. 26-30, 1997, pp. 55-60.

Burns, David M. et al., "Nonlinear Flexures for Stable Deflection of an Electrostatically Actuated Micromirror", SPIE vol. 3226.

Burns, David M. et al., "Optical Beam Steering Using Surface Micromachined Gratings and Optical Phased Arrays", SPIE vol. 3131.

Burns, David M. et al., "Optical Power Induced Damage to Microelectromechanical Mirrors", Elsevier Science, 1998.

Chung, Seok-Whan et al., "Design and fabrication of 10×10 Microspatial Light Modulator Array for Phase Amplitude Modulation", Elsevier Science, 1999.

Cowan, William D., "Optical Phase Modulation Using a Refractive Lenslet Array and Microelectromechanical Deformable Mirror", Aug. 7, 1998.

Cowan, William D. et al. "Surface Micromachined Segmented Mirrors for Adaptive Optics", IEEE Journal of Selected Topics in Quantam Electronics, vol. 5. No. 1 Jan./Feb. 1999.

Ford, Joseph E. et al., "Micromechanical Fiber-Optic Attenuator", Journal of Lightwave Technology, vol. 16, No. 9, Sep. 1998.

Furlani, E.P. et al., "Analysis of Grating Light Valves with Partial Surface Electrodes", Journal of Applied Physics, vol. 83, No. 2, Jan. 15, 1998.

Gani, Dan et al., "Variable Gratings for Optical Switching: Rigorous Electromagnetic Simulation and Design", Optical Engineering vol. 38, No. 3, Mar. 1999, pp. 552-557.

Gustafson, Steven C. et al., "Micro-Actuated Mirrors for Beam Steering", SPIE vol. 3008 1997.

Hom, Craig L. et al., "Simulating Electronstrictive Deformable Mirrors: I. Nonlinear Static Analysis", Advanced Technology Center, Lockheed Martin Missies and Space, Jul. 26, 1999.

Hom, Craig L., et al. "Simulating Electrostrictive Deformable Mirrors: II. Nonlinear Dynamic Analysis", Advanced Technology Center, Jul. 26, 1999.

Horenstein, Mark N. et al., "Differential Capacitive Position Sensor for Planar MEMS Structures with Vertical Motion", Elsevier Science, 2000.

Horenstein, Mark N. et al., "Electrostatice Effects in Micromachined Actuators for Adaptive Optics", Journal of Electronstatics, vol. 42, 1997, pp. 69-81.

Horenstein, M. et al., "Real Time Optical Correction Using Electrostatically Actuated MEMS Devices", Journal of Electrostatics, vol. 46, 1999, pp. 91-101.

Howe, R. T. et al., "Polychrystalline and Amorphous Silicon Micromechanical Beams: Annealing and Mechanical Properties", Sensors and Actuators, vol. 4, 1983, pp. 447-454.

Hung, Elmer S. et al., "Extending the Travel Range of Analog-Tuned Electrostatic Actuators", Journal of Microelectromechanical Systems, vo. 8, No. 4, Dec. 1999.

Hung, Elmer S. et al., "Leveraged Bending for Full-Gap Position with Electrostatic Actuating", Solid-State Sensor and Actuator Workshop, Jun. 8-11, 1998.

Jerman, J. H. et al., "Minature Fabry-Perot Interferometers Micromachined in Silicon for Use in Optical Fiber WDM Systems", IEEE, 1991 International Conference on Solid-State Sensors and Actuators Digest of Technical Papers, 1991.

Lee, SangiShin et al., "Polymeric Tunable Optical Attenuator with an Optical Monitoring Tap for WDM Transmission Network", IEEE Photonics Technology Letters, vol. 11, No. 5, May 1999.

Mali, Raji Krishnamoorthy et al., "Development of Microelectromechanical Deformable Mirrors for Phase Modulation of Light", Optical Engineering vol. 36, No. 2, Feb. 1997.

Mali, Raji Krishnamoorthy et al.m "A Design-Based Approach to Planarization in Multilayer Surface Micromachining", Journal of Micromechanics Microengineering, vol. 9, 1999, pp. 294-299.

Melendez, J. et al., "Spectrally Selective Gas Cell for Electrooptical Infrared Compact Multigas Sensor", Sensors and Actuators A 46-47, 1991, pp. 417-421.

Min, Young-Hoon Min et al., "Modeling, Design, Fabrication and Measurement of a Single Layer Polysilicon Micromirror with Initial Curvature Compensation", Sensors and Actuators 78, 1999, pp. 8-17.

Petersen, K. E., "Micromechanical Light Modulator Array Fabricated on Silicon", Applied Physics Letters, vol. 31, No. 8 Oct. 1997.

Rossberg, D., Silicon Micromachined Infrared Sensor with Tunable Wavelength Selectivity for Application in Infrared Spectroscopy, Sensors and Actuators A 46-47, 1995 pp. 413-416.

Sinclair, M.B. et al. "Synthetic Infrared Spectra", Optics Letters, vol. 22, No. 13, Jul. 1, 1997.

Sinclair, Michael B. et al., "Synthetic Spectra: A tool for Correlation Spectroscopy", Applied Optics, vol. 36, No. 15, May 20, 1997.

Zhu, Lijun et al., "Adaptive Control of a Micromachined Continuous-Membrane deformable Mirror for Aberration Compensation", Applied Optics, vol. 38, No. 1, Jan. 1, 1999.

Hung, E., et al., "The Polychromator: A MEMS Correlation Spectrometer", Microsystems Technology Laboratories Annual Report, May 1998.

Hung, Elmer S., Positioning, Control, and Dynamics of Electrostatic Actuators for Use in Optical and RF Systems:, Massachusetts Institute of Technology, Aug. 21, 1998.

Goose, K.W. et al., "Silicon Modulator Based on Mechanically-Active Anti-Reflection Layer with 1 Mbit/sec Capability for Fiber-in-the-Loop Applications", IEEE Photonics Technology Letters, vol. 6, No. 9, Sep. 1994.

Solgaard, O. et al., "Deformable Grating Optical Modulator", Optics Letters, vol. 17, No. 9, May 1, 1992.

Hung, Elmer S. et al., "MEMS: Research and Applications in Microelectromechanical Systems", Massachusetts Institute of Technology, Mar. 31, 1998.

Butler, Mike et al., "Spectrometers: Digital-transform Spectroscopy Shows Its Versaility," Laser Focus World, Sep. 2005.

Day et al., "Diffractive-MEMS implementation of a Hadamard near-infrared spectrometer", Solid-State Sensors, Actuators and Microsystems, 2005. Digest of Technical Papers. Transducers '05. The 13th International Conference on Seoul, Korea, Jun. 5-9, 2005, Piscataway, NJ, USA, IEEE, Jun. 5, 2005, pp. 1246-1249.

Ford, Joseph E. and James A. Walker, "Dynamic Spectral Power Equalization Using Micro-Opto-Mechanics", IEEE Photonics Technology Letters, vol. 10, No. 10, Oct. 1998.

Senturia, Stephen et al., "Diffractive MEMS: A Versatile Tool," Laser Focus World, Jul. 2004.

* cited by examiner

APPARATUS AND METHOD PROVIDING A HAND-HELD SPECTROMETER

This application is a continuation of, and claims priority under 35 U.S.C. §120 to, co-pending U.S. patent application Ser. No. 11/669,678 entitled "APPARATUS AND METHOD FOR PROVIDING A HAND-HELD SPECTROMETER" filed on Jan. 31, 2007, which claims priority under 35 U.S.C. §119(e) to U.S. Provisional Application Ser. No. 60/763,824, filed on Jan. 31, 2006, each of which is herein incorporated by reference in its entirety.

BACKGROUND OF INVENTION

1. Field of Invention

Embodiments of the invention generally relate to spectroscopy. More specifically, at least one embodiment relates to a hand-held IR spectrometer.

2. Discussion of Related Art

Many bench-top instruments exist that would find a much wider application if they could be reduced to a hand-held tool. The hand-held barcode scanner represents one hand-held tool that has been developed from a bench-top instrument. The barcode scanner was a large instrument used at grocery checkout stands when it was first developed. Subsequently, however, the barcode scanner has become a hand-held tool used for reading barcodes wherever they occur, for example, reading barcodes for the purpose of inventory tracking. The development of a hand-held instrument from a bench-top instrument generally requires a substantial reduction in the size and weight of the instrument. Because portable hand-held tools generally rely on battery power sources, efficient power consumption is also important to reducing weight by reducing the amount of power required for extended operation. That is, given the generally heavy weight of battery power sources, efficient power consumption reduces the amount of battery power required for extended operation and consequently may result in a substantial reduction in the weight of the hand-held instrument. In addition, to be useful, the hand-held instrument should maintain a degree of performance similar to that of the bench-top instrument.

As used herein the term "hand-held" when used to describe an instrument or tool means a device that can be comfortably held by a user with one or two hands, for example, while operating the device. A barcode scanning wand provides one example of a commonly used hand-held device. A hand-held tool may include any of a power cord, a cord that tethers the hand-held device to a main device, and/or a battery pack or other portable power source that provides power for the tool's operation.

Spectroscopy is the study of the spectral characteristics of matter, and the use of such spectral characteristics to obtain qualitative and/or quantitative information about samples of matter (also referred to herein simply as samples). Conventional spectroscopic techniques may utilize absorption spectra of matter or reflectance spectra of matter, as determined by the energy level structures of constituent atoms and molecules, to determine to the presence and/or quantity of such atoms and molecules in the matter.

Instruments used to measure reflectance spectra may be referred to as reflectance spectrometers. In reflectance spectrometers, information concerning the composition of a sample is obtained by projecting light onto a surface of the sample and measuring the amount of the light that is reflected by the sample as a function of wavelength. Because atoms and molecules have unique reflectance spectra (sometimes referred to as spectral signatures), it is possible to determine the presence and/or quantity of constituents of the sample of matter, for example, by determining reflectivity as a function of wavelength. As one of ordinary skill in the art would understand, use of the term "wavelength" herein, such as when referring to a wavelength of light that is detected or a wavelength of light from a source, refers to light of the indicated wavelength and light from a finite band of wavelengths around said wavelengths, as may be determined by the laws of physics and/or conventional design practices.

There exist numerous types of conventional reflectance spectrometers. Conventional reflectance spectrometers typically have the following features in common: a light source that covers a desired band of wavelengths from which spectral signatures are to be determined; a detector (or detector array) that is sensitive to light in the desired wavelength range; and optical componentry (e.g., a focusing element) that collects the light after it interacts with the sample of matter and directs the collected light onto the detector. Additionally, because information is present in the reflected light as a function of incident wavelength, an apparatus providing wavelength selection is typically included.

Conventional reflectance spectrometers may employ any of several different wavelength selection and detection techniques, for example: a monochromator-type spectrometer projects wavelengths of light sequentially onto a sample; an optical multichannel analyzer projects multiple wavelengths of light from a broadband light source onto a sample simultaneously, and then projects the reflected light onto a detector array; and, a filter wheel spectrometer projects light from a broadband source though each of a series of fixed optical filters in a sequential manner (e.g., by locating the filters on a motor-driven chopper wheel), to illuminate a sample with a sequence of different wavelengths of light.

An instrument that currently has a wide range of uses as a bench-top instrument is the IR spectrometer. The IR spectrometer is employed as an analytical instrument in the to food, pharmaceutical, petroleum, and agriculture industries for identification and quantification of chemical compounds. The IR spectrometer can also be employed in many other applications. Although many of the applications for the IR spectrometer would benefit from the availability of a hand-held IR spectrometer, none exist at present. Further, there have been few attempts to produce a hand-held IR spectrometer because of the size and power requirements of components employed in conventional IR spectrometers. One example of a "portable" IR spectrometer is the Luminar 5030 by Brimrose [www.Brimrose.com]; however, this device still requires 90 watts of power and is not hand held because it weighs tens of pounds.

The optical requirements and/or the cooling systems of current IR spectrometer designs are generally incompatible with a lightweight, portable instrument. For example, a conventional monochromator IR spectrometer includes a grating, a heavy rigid structure to maintain accuracy while the grating is being rotated, and a drive motor to rotate the grating. The size, weight and power consumption that results from these components reduces the likelihood that they can be included in a hand-held instrument. Similarly, conventional Fourier transform IR spectrometers also include moving parts and require heavy, rigid structures and a drive motor to operate accurately. The optical multi-channel analyzer or diode array spectrometer has no moving parts; however, in the IR part of the spectrum, the analyzer requires that the detector be cooled to meet minimum performance standards. The required cooling system includes a heat sink and thermoelectric cooler that consume a relatively large amount of power. Thus, the power consumption of a multi-channel IR analyzer is too great for it to be employed as a hand-held instrument because a large power source would be required for its operation.

SUMMARY OF INVENTION

In view of the mentioned related art, a hand-held infrared ("IR") spectrometer according to the invention includes optical components selected for low power consumption, and processor controlled electronics to maximize the life of a battery power source included in the spectrometer, and in particular, to provide a hand-held IR spectrometer that is lightweight and can operate continuously for an extended period to time. According to one embodiment, the hand-held IR spectrometer meets substantially the same performance levels as a bench-top IR spectrometer.

According to one embodiment, an IR spectrometer includes a light source adapted to to illuminate a sample with light, a grating adapted to spectrally disperse the light that has illuminated the sample to provide a dispersed light, a MEMS array adapted to be electrostatically actuated by a controller to control a diffraction of the dispersed light to provide a plurality of wavelengths of light, a detector configured to detect the plurality of wavelengths of dispersed light, and wherein the controller is adapted to control the MEMS array so as to manage a power consumption of the MEMS array and is further adapted to control the MEMS array so as to diffract the plurality of wavelengths of light.

According to one embodiment, the IR spectrometer includes a housing sized and arranged to house the light source, the grating, the MEMS array, the controller, and the detector in a hand-held device.

In one embodiment, the controller is configured to control the MEMS array such that the spectrometer is adapted to be operated as a Hadamard transform spectrometer.

According to another aspect, an IR spectrometer includes a light source adapted to illuminate a sample with light, a grating adapted to spectrally disperse the light that has illuminated the sample to provide a dispersed light, a MEMS array adapted to be electrostatically actuated by a controller to control a diffraction of the dispersed light, a detector configured to detect the dispersed light, and a battery power source adapted to supply power to the light source and to the MEMS array, wherein the controller is adapted to control the MEMS array so as to manage a power consumption of the IR spectrometer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
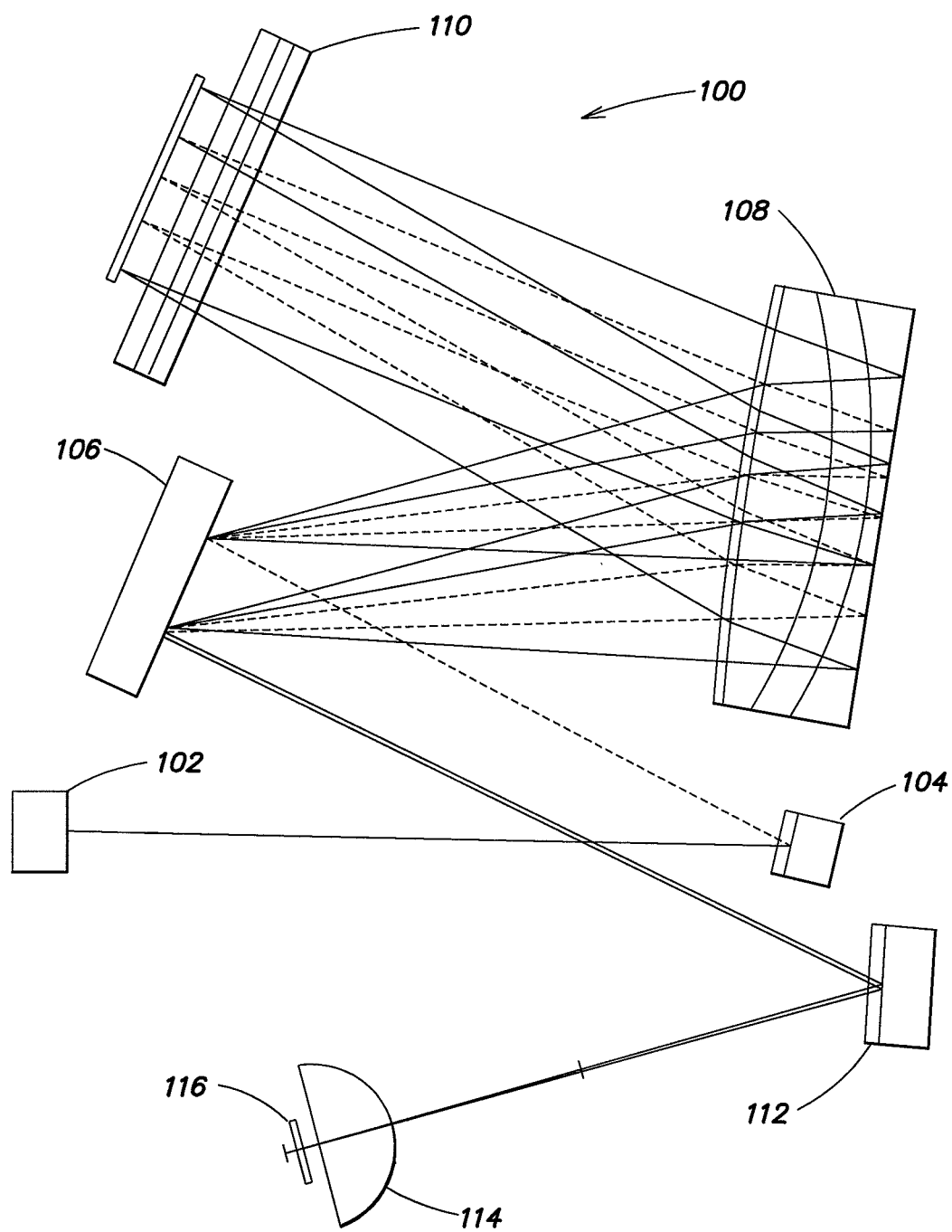
FIG. 1 illustrates an overview of a layout of optical components in a spectrometer in accordance with an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

To be a practical "hand-held" instrument, the IR spectrometer should meet generally accepted ergonomic standards for such tools. Eastman Kodak's publication [Eastman Kodak Co. 1983, *Ergonomic Design for People at Work*, Lifetime Learning Pub., Belmont, Calif.] describes requirements for hand-held tools generally and includes a recommended maximum weight of five pounds for hand-held tools. Further, the size/volume of the tool should be small enough so that the tool is not cumbersome and unwieldy. The above-recommended maximum weight may also limit the power capacity of the tool, and consequently, the amount of time that the tool can operate. That is, the weight of a power source generally increases as its power rating increases, and in particular, the weight of battery power sources becomes quite large relative to the overall weight of the tool when large amounts of power are required for the tool's operation. As a result, the power consumption of the tool should be controlled to allow the tool to be used over an extended period of time (e.g., hours) with a relatively lightweight power source, for example, a battery power source that is light enough to be employed in a hand-held tool.

In practice, to be hand held and portable, a spectrometer should contain its own light source. Light sources, however, consume a considerable amount of power. Thus, the power consumption of both the spectrometer electronics and the light source are important considerations when developing a hand held IR spectrometer.

FIG. 1 illustrates optical components 100 employed in an embodiment of a hand-held IR spectrometer. The optical components 100 includes an optical input 102, a first collimating mirror 104, a grating 106, a focusing mirror 108, a microelectromechanical system ("MEMS") 110, a second collimating mirror 112, a lens 114, and a detector 116.

In one embodiment, the optical input 102 is an optical fiber that transmits incident light reflected from a sample undergoing analysis, for example, a sample located in a reflectance probe. According to one embodiment, light from the optical input 102 is directed via a multimode optical fiber to the first collimating mirror 104. The first collimating mirror 104 is employed to insure that light from the optical input 102 includes light waves that travel substantially parallel to one another. Light incident upon the first collimating mirror 104 is reflected to the grating 106. According to one embodiment, the grating 106 is a fixed grating that spectrally disperses the incident light. The dispersed light is directed to a focusing mirror 108 where it is focused onto the MEMS 110.

According to one embodiment, the MEMS 110 is a micro-diffractive MEMS grating that acts as a spatial light modulator to remove light from the zero order and place it in a higher diffracted order. The diffracted light is blocked by an aperture from reaching the detector. The aperture can be located anywhere between the grating 106 and the lens 114 with suitable adjustment in the size of the aperture depending on the distance that the aperture is located from the MEMS 110. The zero order light is collected by the focusing mirror 108 and returned to the grating 106. The reflected light is incident back on the grating 106 where it is recombined into a single beam. The single beam of light is directed from the grating 106 to the second collimating mirror 112 that, according to one to embodiment, collimates the spectrally-un-dispersed light and directs it to the lens 114 where it is focused on the detector 116. It is to be appreciated that in one embodiment, the system 100 does not include the lens 114.

According to one embodiment, the MEMS 110 is included on a chip and provides a controllable diffraction grating. As is known by those of ordinary skill in the art, embodiments of such a controllable diffraction grating may include individually controllable grating elements that can be employed to provide individual diffraction of an optical signal at selected wavelengths. According to one embodiment, the MEMS 110 is a micro-diffraction grating MEMS chip that includes 100 pixels that can be electrostatically actuated (turned on and off) to control the diffraction of light to provide a plurality of wavelengths of diffracted light. For example, the MEMS 110 of the invention can be actuated to turn on and off different combinations of the MEMS elements to diffract a plurality of wavelengths of light incident on the MEMS array according to the hadamard matrix, which is known to those of skill in the art. It is to be appreciated that the MEMS 110 of the can be actuated to turn on and off different combinations of the MEMS elements to diffract a plurality of wavelengths of light incident on the MEMS array such as disclosed in either of U.S. Pat. No. 6,329,738 and U.S. Pat. No. 6,724,125, which are herein incorporated by reference. In addition, the MEMS array can be one or more embodiments of a diffractive MEMS as described in the article entitled "Diffractive MEMS: a versatile tool" by S. Senturia et al., as published in Laser Focus World in July 2004 and can be one or more embodiments of a diffractive MEMS as described in the article entitled "SPECTROMETERS: Digital-transform spectroscopy shows its versatility as published in Laser Focus World in September, 2005, which are, also herein incorporated by reference.

In accordance with one embodiment, the MEMS 110 is used as a spatial light modulator to control the intensity of the light reflected from the MEMS at each of a plurality of wavelengths, e.g. to reflect light according to the Hadamard matrix. As a result, the MEMS 110 functions as a programmable spectral filter that is controlled by a processor, computer or other controller (such as controller 218 of FIG. 2A) that can be included in the IR spectrometer. It is also to be appreciated that the controller need not be part of the hand-held spectrometer, but instead can be a main controller tethered or wirelessly electronically linked to the hand-held spectrometer.

It is to be appreciated that the MEMS 110 provides the spectrometer with a substantial amount of versatility because the MEMS is programmable. That is, the MEMS 110 can be programmed so that the IR spectrometer operates as any one of a plurality of different types of IR spectrometers. For example, in a first stage of operation, the IR spectrometer may operate in the manner of a scanning monochromator instrument, by employing the MEMS 110 to sequentially turn on one spectral region at a time for analysis. Further, in a second stage of operation, the IR spectrometer may perform as a filter wheel spectrometer (without the need for a natural filter wheel) by using the MEMS 110 to turn on different spectral masks. In addition, the MEMS 110 can also be programmed so that, in a third stage of operation, a complete sequence of orthogonal spectral masks (as occurs with a Hadamard transform or a Fourier transform) can be used and the resulting transform spectrum converted into a real spectrum using the transform matrix.

In the process of making measurements with a Hadamard or other transform, the MEMS effectively modulates the light traveling the desired path. In this embodiment, the desired path results in light being incident on the correct portion of the MEMS 110. For example, the MEMS 110 does not modulate light traveling an undesired path such as light striking the wrong portion of the MEMS 110 or not striking a portion of the MEMS 110. Thus, the MEMS effectively eliminates any contribution to the signal from scattered or stray light, and dark current. The result of eliminating stray light and dark current is greater measurement accuracy and stability over a range of temperatures. It is to be appreciated that the hand-held IR spectrometer of the invention can be configured to accomplish one or more embodiments of a digital-transform spectrometer ("DTS") employing a programmable diffractive-MEMS chip, for example, according to the article entitled "SPECTROMETERS: Digital-transform spectroscopy shows its versatility" by M. Ramani et al. as published in Laser Focus World in September, 2005, which is, herein incorporated by reference. Such embodiment of the DTS employs an approach to eliminate the effect of stray light and dark current on spectral measurements.

It is to be appreciated that one advantage of the above-described embodiment is that the optical components can be employed in a very lightweight spectrometer because, for example, there are no moving parts. In particular, a light weight spectrometer is possible because the MEMS elements move less than a micron in distance. In addition, an advantage of use the MEMS element as described herein is that only a single detector need be used, in contrast to for example a detector array, because the MEMS element provides to the various diffracted wavelengths of light to the single detector. This provides an advantage because the single detector is small and can be cooled with, for example, a half a watt of power (in contrast to a diode array that requires several watts of power for cooling).

Figure 2A:
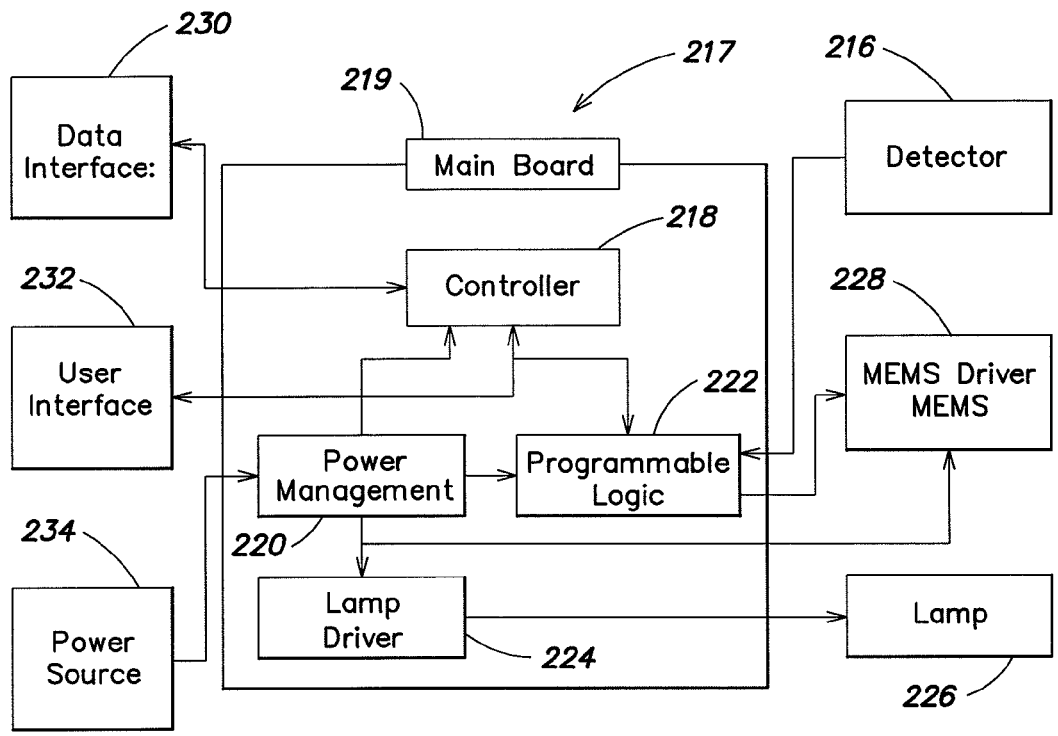
FIG. 2A illustrates a block diagram of the electronics used in an embodiment of the invention.

Referring now to FIG. 2A, a block diagram of electronics 217 used in an embodiment of the IR spectrometer is illustrated. The electronics can include a controller 218, a power management system 220, a programmable logic device 222 (e.g., a FPGA), a lamp driver 224, a lamp 226, the MEMS 110, a MEMS circuitry 228, the detector 216, a data interface 230, a user interface 232, and a power source 234.

In general, according to one embodiment, the controller 218 controls the overall operation of the IR spectrometer. More specifically, the controller controls the exchange of information on the data interface 230, the operation of the spectrometer through the user interface 232, the operation of the programmable logic 222, and the power management system 220. In one embodiment, the power management system 220 is included in the controller 218. According to one embodiment, the controller comprises various software scripts to test the wavelength of the instrument, to do a self calibration of the instrument, to measure samples to be measured with the instrument and collect spectral data about the sample. In addition, according to some embodiments of the invention, the controller 218 can be further provided with software to identify the material or materials of the sample from the collected spectral data, such as commercially available chenometric software like "Unscrambler by CAMO, which identifies the material from models of the spectral data. It is to be appreciated that in various embodiments, the controller 218 may be implemented in hardware, software, firmware or a combination of any of these. According to one embodiment, the controller is a computer, for example, an embedded PC. In one version, the controller 218 is an embedded PC that meets an embedded computer standard such as PC/104. In another embodiment, the controller 218 is a microcontroller.

According to one embodiment, power management of the spectrometer entails minimizing consumption of the battery power through control of the lamp driver circuit 224 and lamp 226, as well as other components such as the user interface 232 and the MEMS circuit 228 that may use significant power. For example, the power management system 220 may include a timing circuit that is used to determine when the spectrometer is not being used. In one embodiment, the lamp 226 and other circuits (e.g., MEMS circuitry 228) which consume large amounts of power are turned down or off when the spectrometer has to been inactive for a pre-established amount of time. In addition, the pre-established amount of time can be selected by the user in advance, for example, with the user interface 232. In particular, the user may preset the amount of time to match the requirements of the specific task in which the spectrometer is being used. It is to be appreciated that power management of the hand-held IR spectrometer device need not entail controlling each element that consumes power and can, for example, comprise turning off the MEMS device but need not turn off the lamp and lamp driver or other components of the spectrometer. One of ordinary skill in the art should also recognize additional approaches to manage the power consumption of the electronics 217.

In some embodiments, the power source 234 is a battery power source. In general, a battery source with a high energy density (for example, 150 W-hrs/kg) should be employed. In one embodiment, the battery provides a minimum of at least 25 W-hrs of energy. In a version of this embodiment, the power source includes four lithium-ion batteries of 2000 mA-hrs and 3.6V in a battery pack, for example, a lithium-ion battery #18650 supplied by batteryspace.com. In another version of this embodiment, the power source 234 includes a battery power source and an AC power source. In particular, the power source 234 includes an AC power source so that, for example, the IR spectrometer can be connected to a 120 VAC source via a plug and a cord which can be disconnected from the spectrometer when the IR spectrometer operates on battery power. It is also to be appreciated that the power source 234 need not include a battery power source.

In various embodiments, the data interface 230 is an Ethernet or a USB data interface that can be used to upload and download files, for example, to and from the controller 218. For example, the data interface can be used to transfer data in text based files to a remote PC via a USB connection. In one or more alternate embodiments, the data interface can include a wireless transceiver for communication between the IR spectrometer and a remote transceiver. As will be recognized by those of ordinary skill in the art, the data interface may also support other types of communication, such as a high-speed USB device.

In various embodiments, the user interface 232 includes a LCD display that provides feedback to the user concerning the operation of the IR spectrometer. In some embodiments, the user interface 232 allows a user to input information into the spectrometer, for example, by selecting one or more control elements (touch screen elements, push buttons, selector switches, etc.). The user interface 232 may also be used to program the controller 218. The user interface 232 may also display a wide variety of information concerning both the operation of the IR spectrometer and data of the sample that is being analyzed with the spectrometer. Some examples of information that may be displayed include: an indication of a power level of the power source 234 included in the spectrometer; an indication that the power source 234 is being charged; an indication whether the spectrometer is being powered by an integral power source (e.g., battery power) or via an external power source (e.g., it is operating on 120 VAC power); settings for a sample to be analyzed; information concerning the absorption and/or reflectance of various wavelengths of incident light on the sample; and the like.

Figure 5A:
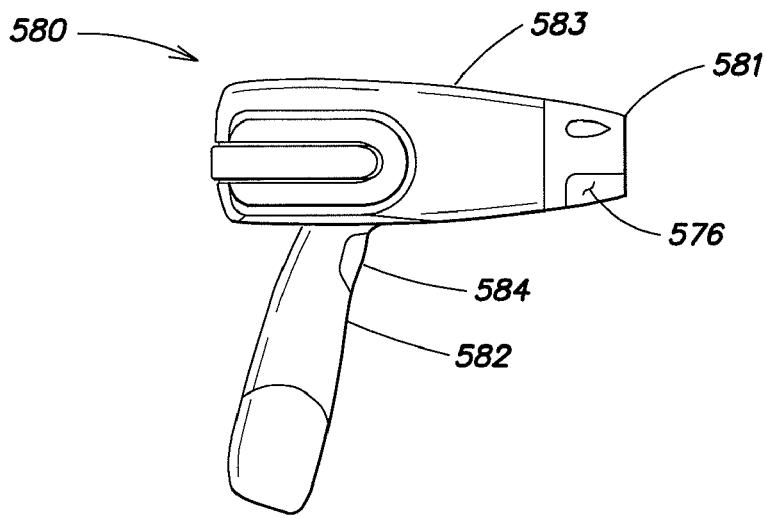
FIGS. 5A-5C illustrate various views of an embodiment of a hand-held IR spectrometer in accordance with an embodiment of the invention.
Figure 5B:
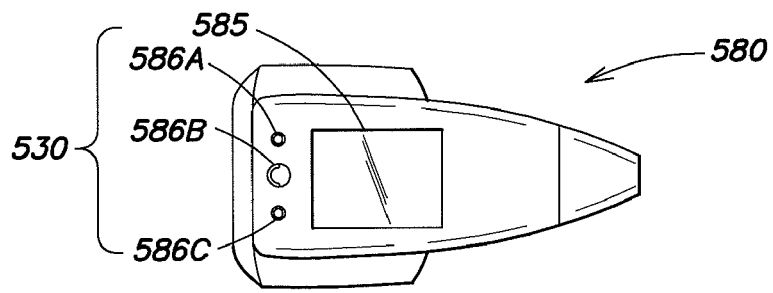
Figure 5C:
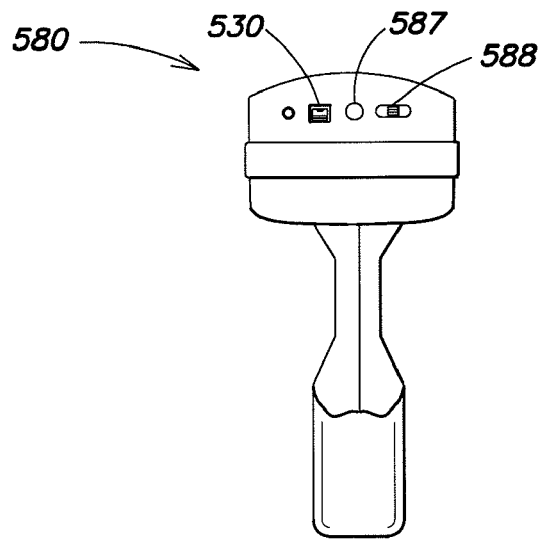
Figure 6:
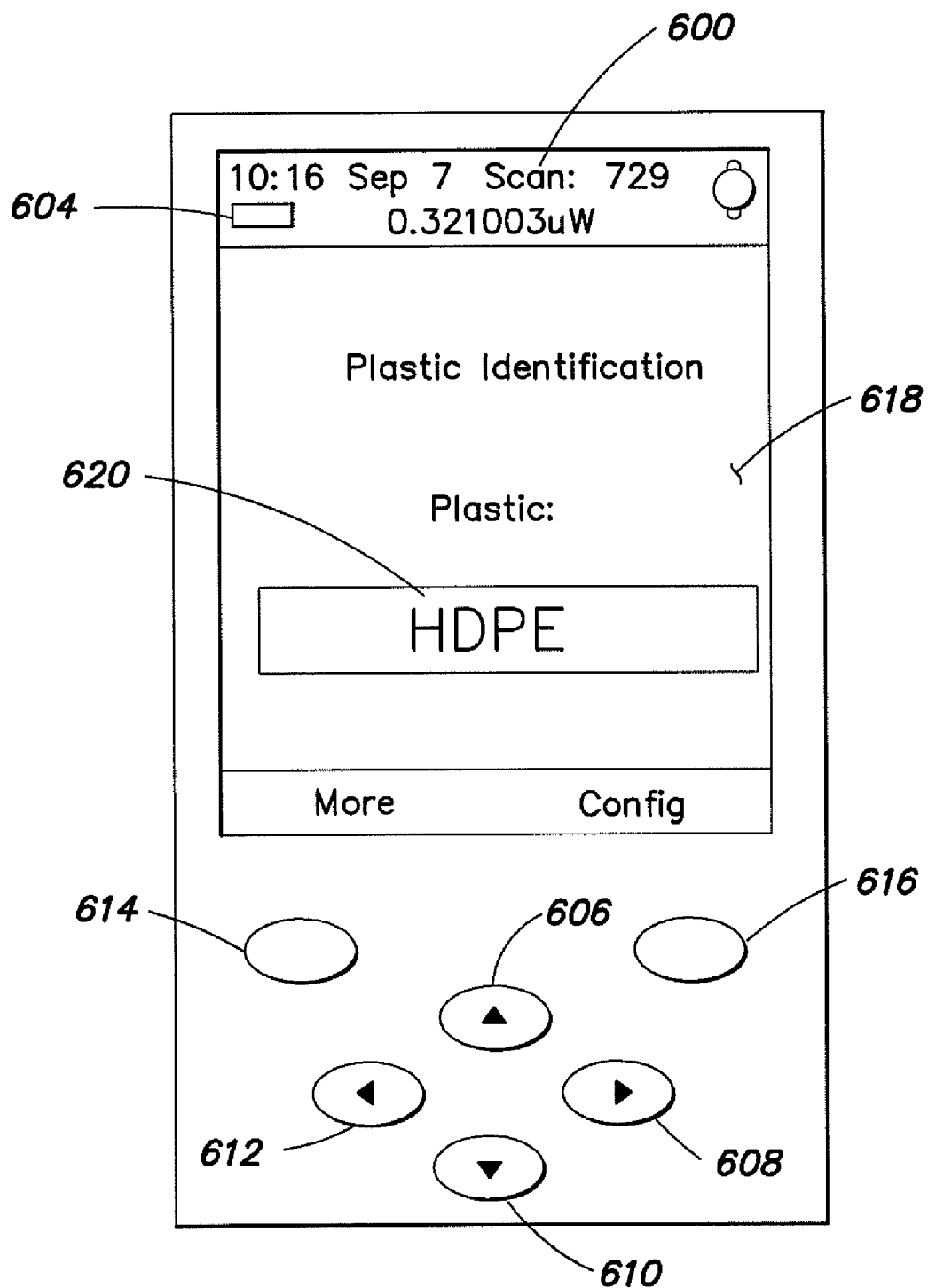
FIG. 6 illustrates an embodiment of a display of the hand-held IR spectrometer.

One embodiment of a user interface is shown in FIG. 6. The user interface includes a color LCD screen 618 and allows for user data entry via 4 navigation buttons 606, 608, 610, 612 and two multipurpose soft-buttons 614, 616. FIG. 6 illustrates another embodiment of a user interface of the IR spectrometer device, which can display, for example, a scan number 600 at the top of the display that is taken by the device after pulling the trigger 584 (See FIGS. 5A-5C). The display can also provide, for example, a battery charge indicator 604, which is illustrated at the top left of the display, as well as anything else to be displayed by the IR spectrometer such as the identification 620 of the material being measured. This embodiment of the user interface is configured with four buttons 606, 608, 610, 612 oriented in a diamond configuration that provide for navigation through the various menus of the device as provided on the display. This embodiment of the user interface is also provided with two soft key buttons 614, 616 that provide for other functions of the device. As is illustrated in FIG. 6, the display provides the identity of the material to the user upon completion of the measurement process as is described herein.

According to one embodiment, the programmable logic device 222 is a field programmable gate array ("FPGA") that includes programmable logic gates. In a version of this embodiment, the FPGA provides the interface for control of both the detector electronics and the MEMS driver electronics by, for example, providing reconfigurable logic employed to process data from the controller 218. This electronics configuration is only an example of several possible configurations. Other variations may, for example, include an application specific integrated circuit ("ASIC") and logic devices known to those of skill in the art.

According to one embodiment, the controller 218, the power management system 220, the programmable logic device 222, and the lamp driver 224 are all included on a single main circuit board 219.

Figure 2B:
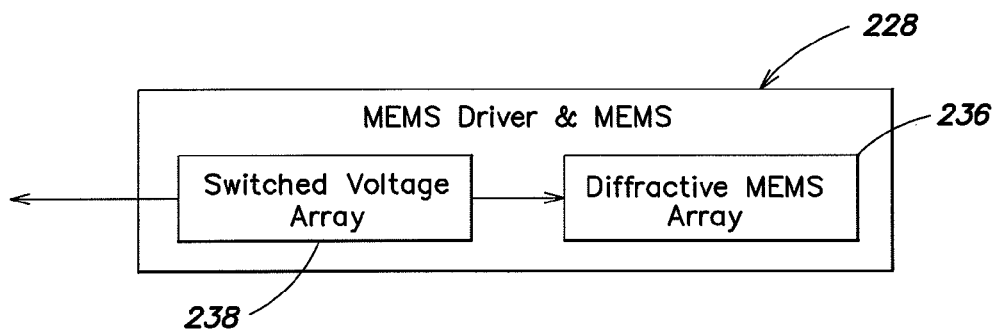
FIG. 2B illustrates a block diagram of a MEMS and MEMS driver employed in an embodiment of the invention.

Referring now to FIG. 2B, there is illustrated an embodiment of the MEMS device 228 comprising a MEMS device 236 and a MEMS driver 238. According to one embodiment, the MEMS device 236 is a diffractive MEMS array and the MEMS driver 238 is a switched voltage array. In this embodiment, the MEMS driver 238 can include a plurality of switched voltage sources that are used to selectively turn individual diffractive elements of the MEMS array optically-on and optically-off according to the principles discussed herein to diffract the incident light. That is, the MEMS driver 238 can be used to control the MEMS 236 to reflect selected wavelengths of the light reflected from the sample so that only selected wavelengths are received by the detector. In a version of this embodiment, the MEMS device 236 is a chip and both the MEMS device and the MEMS driver 238 are located on a single circuit board. In one embodiment, the MEMS driver 238 includes 100 switched voltage sources.

Figure 2C:
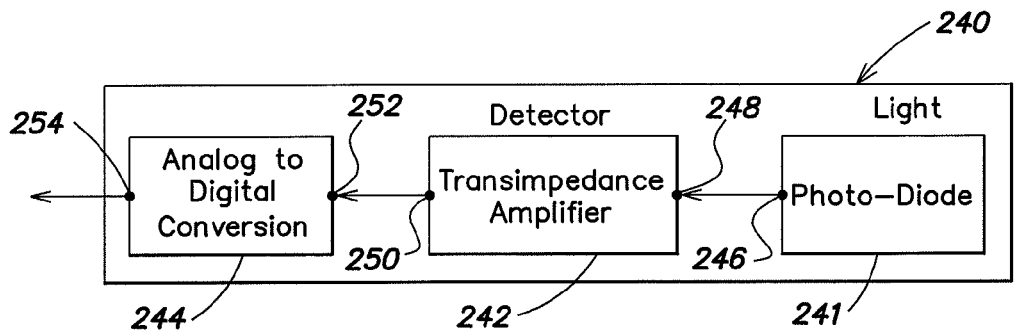
FIG. 2C illustrates a block diagram of a detector employed in an embodiment of the invention.

FIG. 2C illustrates a block diagram of one embodiment of detector electronics 240. According to an embodiment of the invention, the detector electronics 240 include a photodiode 241, an amplifier 242, and an analog-to-digital ("A/D") converter 244. In one embodiment, the photodiode 241 is a single-element InGaAs photodiode. In a version of this embodiment, the photodiode 241 includes a built-in cooler. In one embodiment, the amplifier 242 is a transimpedance amplifier that receives an output voltage from the photodiode and that amplifies the voltage into a suitable voltage range for the analog to digital converter 244, for example over the input dynamic range of the analog to digital converter.

In particular, according to one embodiment of the detector electronics 240, the photodiode 241 includes an output 246 that provides a signal, corresponding to the detected light signal, to an input 248 of the amplifier 242. The amplifier 242 amplifies the detected signal and provides an impedance match to the photodiode 241. The amplifier 242 provides the amplified signal at an output 250 to an input 252 of the A/D converter 244. The A/D converter 244 converts the amplified signal to a digital signal and provides a digital signal corresponding to the amplified signal at an output 254. In a version of this embodiment, the to photodiode 241 is operated in a photovoltaic mode while coupled to the amplifier 242. According to one embodiment, the A/D converter 244 is a 24 bit A/D converter that provides a dynamic range of approximately 6 orders of magnitude. For example, in one embodiment, the A/D converter 244 provides a dynamic range of almost a million to one. In a version of this embodiment, the timing of the switching and A/D conversion is controlled by the programmable logic device 222.

The electronics illustrated in FIGS. 2A-2C contribute to reducing the weight of the IR spectrometer as compared, for example, with bench-top IR spectrometers. It is to be appreciated that in one or more embodiments, the electronics illustrated in FIGS. 2A-2C substantially reduce the weight and the size of the IR spectrometer, for example, by using the MEMS device and a single detector device. In addition, the electronics illustrated in FIGS. 2A-2C substantially reduce the power consumption of spectrometer. More specifically, in one embodiment, the MEMS 110 is electrostatically driven to draw substantially no current in the static state. That is, in one embodiment, the MEMS array device consumes substantially no power when the grating elements are not actuated. In addition, the power management system 220 may turn off the power supplied to the MEMS circuit during periods when the spectrometer is not in use. In addition, a low power microprocessor can be used for controller 218 to control all functions of the spectrometer. In one embodiment of the hand-held spectrometer, total power consumption is maintained at 5 W or less when the IR spectrometer is operating.

Figure 3A:
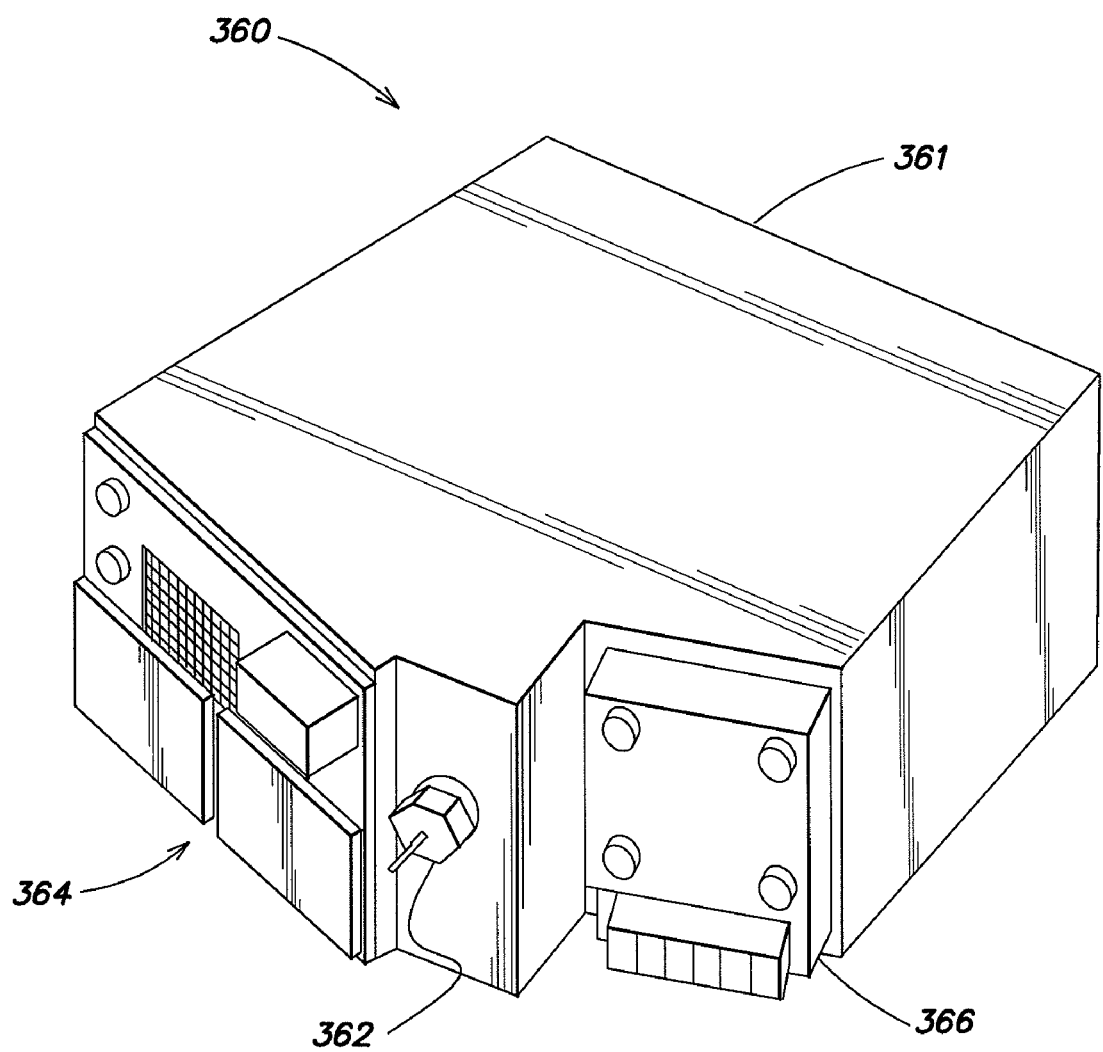
FIG. 3A illustrates a perspective view of an optical module in accordance with an embodiment of the invention.
Figure 3B:
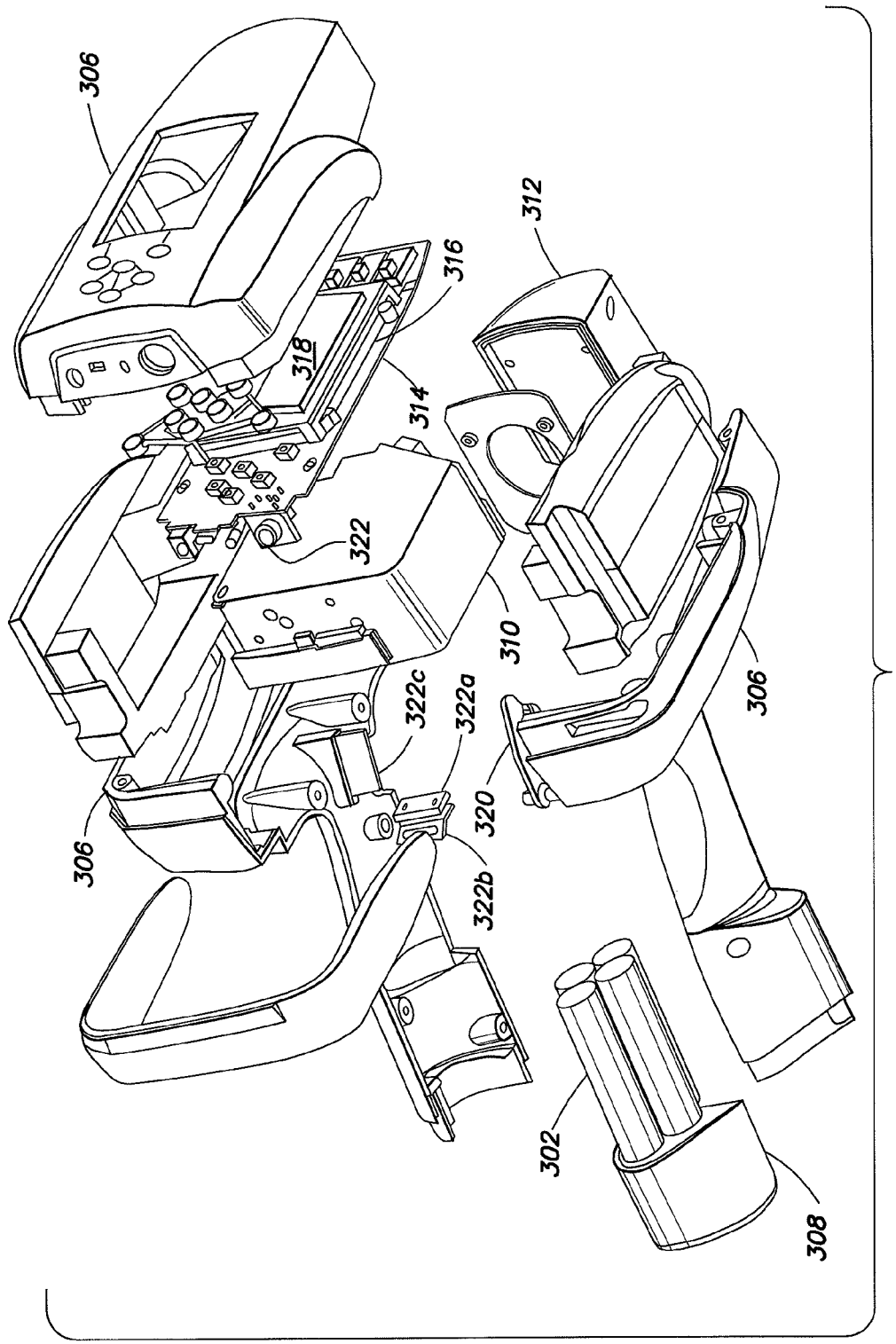
FIG. 3B illustrates an exploded view of an embodiment of the hand-held IR spectrometer.

According to one embodiment, the optical components 100 as described herein are packaged in an optical module 360 as illustrated in FIG. 3A. The optical module is part of the hand-held spectrometer as illustrated in the exploded view of FIG. 3B. This embodiment of the hand-held spectrometer includes a plurality of batteries or a battery pack 302 are housed in a handle portion of an overall housing 306. The handle can be provided with a battery door 308 for access to the battery power source. The hand-held spectrometer also comprises an optics module 310, such as the optics module discussed above with reference to FIG. 3A. In addition, the hand-held spectrometer comprises a reflectance probe 312 that will be discussed in further detail with respect to FIG. 3B. In addition, the hand-held spectrometer includes a PCB board that houses components of the overall device, such as the main board 219 (See FIG. 2A) which houses the controller, power management and programmable logic devices. The hand-held spectrometer also includes a plurality of to spacers 316 that can be used to mount or space various IC components 318 to the PC board 314. The hand-held spectrometer also includes a trigger device 320 and various trigger components 322a-c for initiating a calibration or measurement as is described in further detail herein. It is to be appreciated that the exploded view of the hand-held spectrometer of FIG. 3B illustrates various other components of the -held spectrometer device such as a power switch 322, various LEDs, an LCD display, a USB port, and the like, that are not specifically called out here by reference numbers.

The optical module 360 includes a housing 361, which in a version of this embodiment is an aluminum box with a lid that is black anodized on the inside to help control scattered light. In addition, the optical module 360 includes a fiber input 362, a MEMS board 364, and a detector module 366. In one embodiment, all of the optical components illustrated in FIG. 1 (e.g., the first collimating mirror 104, the grating 106, the focusing mirror 108, the MEMS 110, the second collimating mirror 112, the lens 114, and the detector 116) are included in the optical module 360, with the understanding that the MEMS 110 is included on the MEMS board 364 and the detector 116 is included in the detector module 366.

According to one embodiment, flexure mounts, for example, IXF.50 flexure mounts from Siskiyou, Inc., are used in the optical module 360 to mount the collimating and focusing mirrors (e.g., the mirrors 104, 112). In one embodiment, the optical module 360 receives light from a reflectance probe at the fiber input 362. The fiber input 362 transmits the light from a reflectance probe in the IR spectrometer to the optical module 360 where the light is directed to the optical components in the manner described with reference to FIG. 1. As a result, spectral analysis of a sample is accomplished.

Figure 7A:
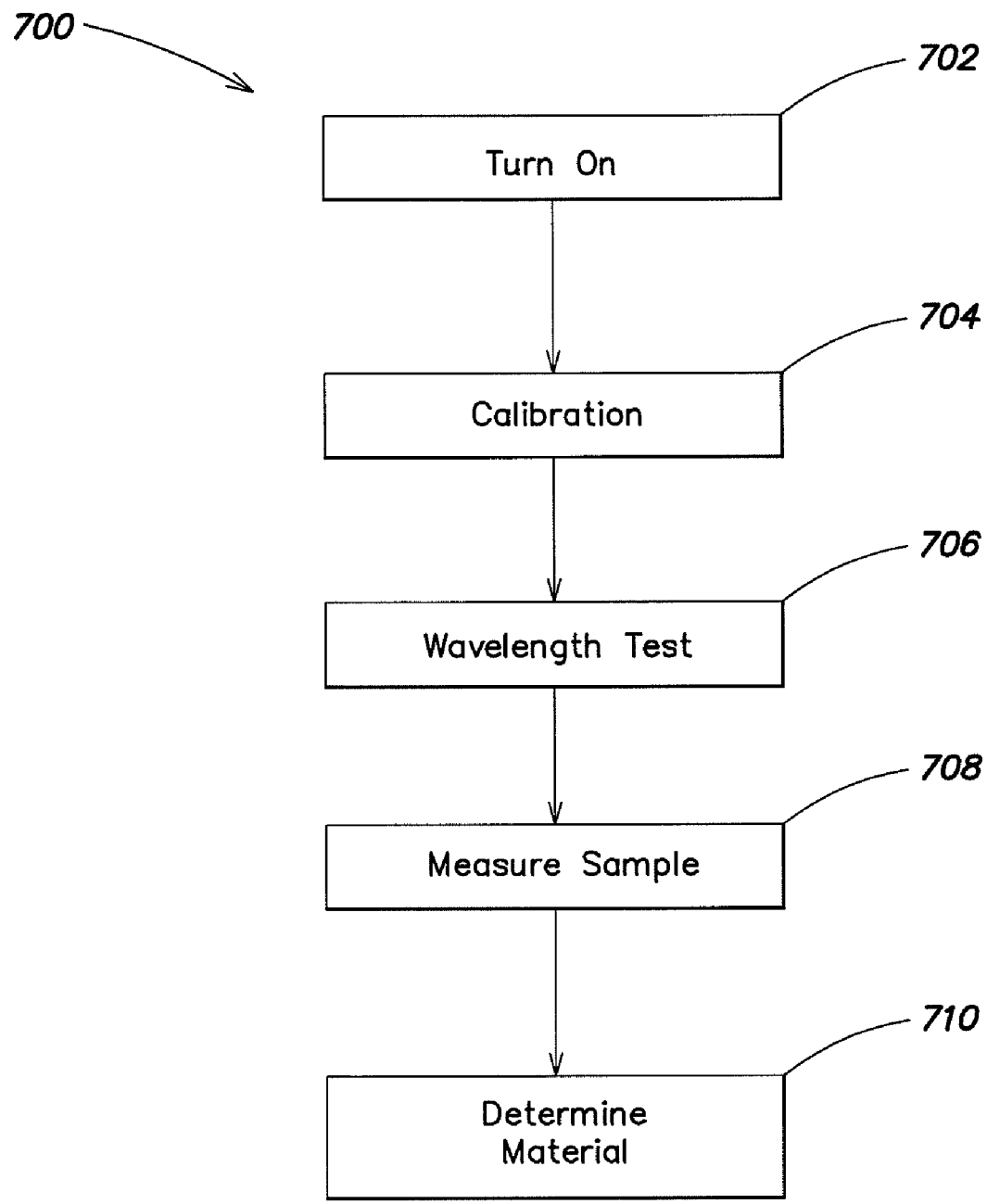
FIGS. 7A-B illustrates an embodiment of a process for using the hand-held IR spectrometer described herein to identify sample materials.

According to some embodiments of the hand-held IR spectrometer, the controller is configured with script for accomplishing a non-destructive method of measuring the optical properties of the sample to be measured, for example, by transmitting a desired wavelength or wavelengths of light to the sample and determining the composition of the sample based on the amount of light reflected by the sample at various wavelengths. For example, FIG. 7A illustrates an embodiment of a method 700 of operating an IR spectrometer as disclosed herein. The spectrometer is turned on at step 702 and allowed to run through its boot up operations until, for example, the spectrometer device indicates that it is booted up and ready. A next step 704 is a calibration of the IR spectrometer. According to some embodiments, the spectrometer is provided with a reference device to be placed at the sampling area of the device and measured for calibration of the device. The test device is measured and the IR spectrometer calibrates itself according to principles known to those of skill in the art. According to some embodiments of the invention, the IR spectrometer can also be provided with known materials, for example carpet materials, and the known materials can be measured with the IR spectrometer to confirm the spectrometer is correctly identifying the materials. Additionally or alternatively, according to some embodiments, the IR spectrometer can be provided with a wavelength calibration device, such as a sample material, that is measured at step 706 to confirm the device has been properly calibrated. If the device has not been properly calibrated, steps 704 and 706 can be repeated. If the device has been properly calibrated, the user can proceed to use the IR spectrometer to measure the material(s) that are to be identified at step 708, and to identify the material with the IR spectrometer device at step 710, as will now be discussed in further detail with reference to FIG. 7B.

Figure 7B:
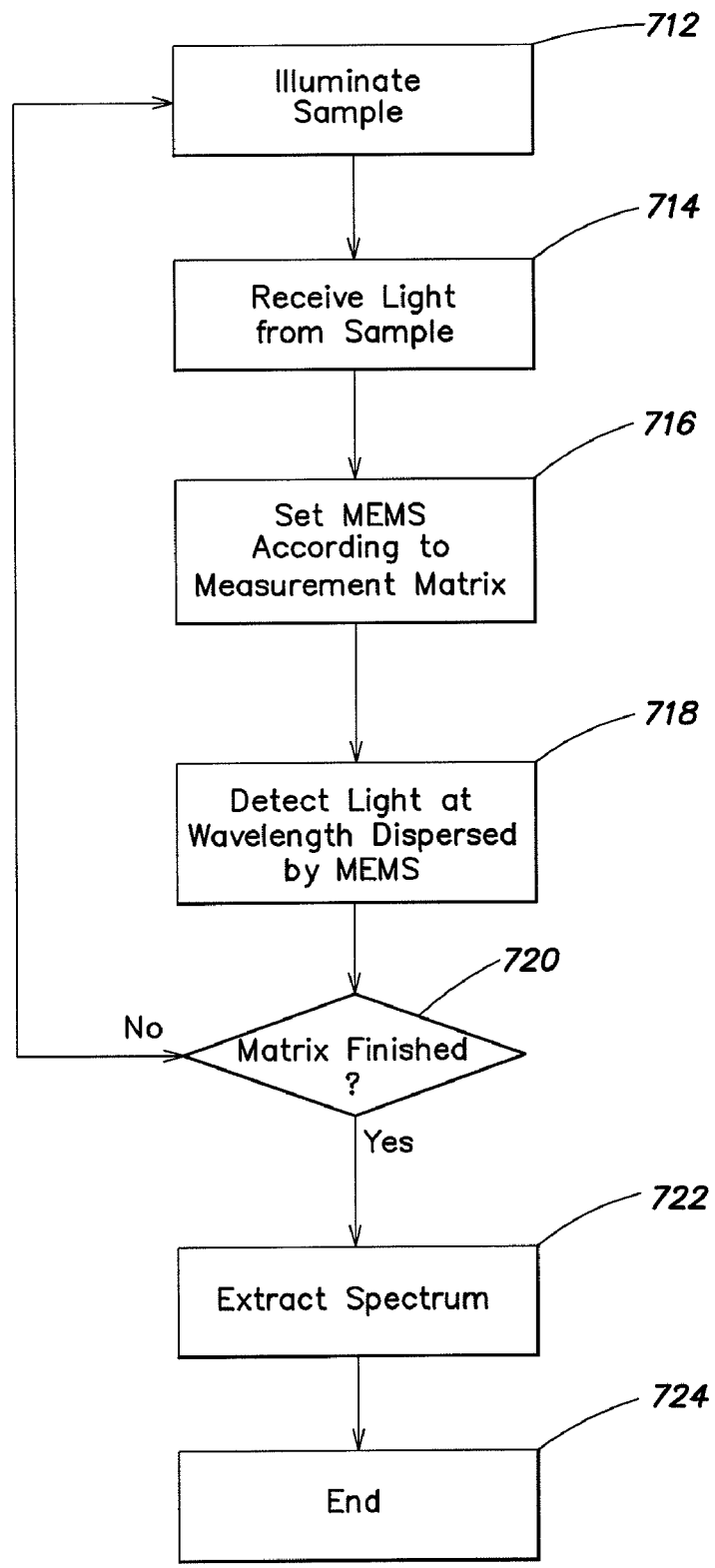

Referring to FIG. 7B, a sample is measured by placing the sample at the measurement area of the IR spectrometer device or alternatively by contacting the IR spectrometer device to the sample and illuminating the sample with the IR spectrometer device at step 712. Light reflected by the sample to be measured is collected with the IR spectrometer device at step 714. The IR spectrometer device at step 716 also sets the MEMS device 110 (See FIG. 1) to a position for providing a wavelength of the reflected light from the sample to the detector 116, according to any of the measurement transforms that have been discussed herein (e.g. Hadamard matrix). The detector detects the light provided by the MEMS at step 718 and determines whether the IR spectrometer has gone through all positions of the matrix at step 720. If the MEMS device has not been actuated through all of its positions that correspond to the measurement matrix, then the device returns to step 712 to illuminate the sample for another position of the measurement matrix, and executes steps 712-718 until the measurement matrix has been completed. Once the sample has been measured by the IR spectrometer device for all positions of the measurement matrix, the device proceeds to extracts the spectrum of the reflected light from the sample and to determine the identity of the sample material from the extracted spectrum at step 722. The process is then completed at step 724. The process of measuring the sample and identifying the material can be repeated for additional samples.

As will be appreciated with further reference to FIGS. 5A-5C, the hand-held spectrometer can be configured to accomplish simple point and shoot operation on a sample to accomplish the non-destructive method of IR material analysis.

Figure 4:
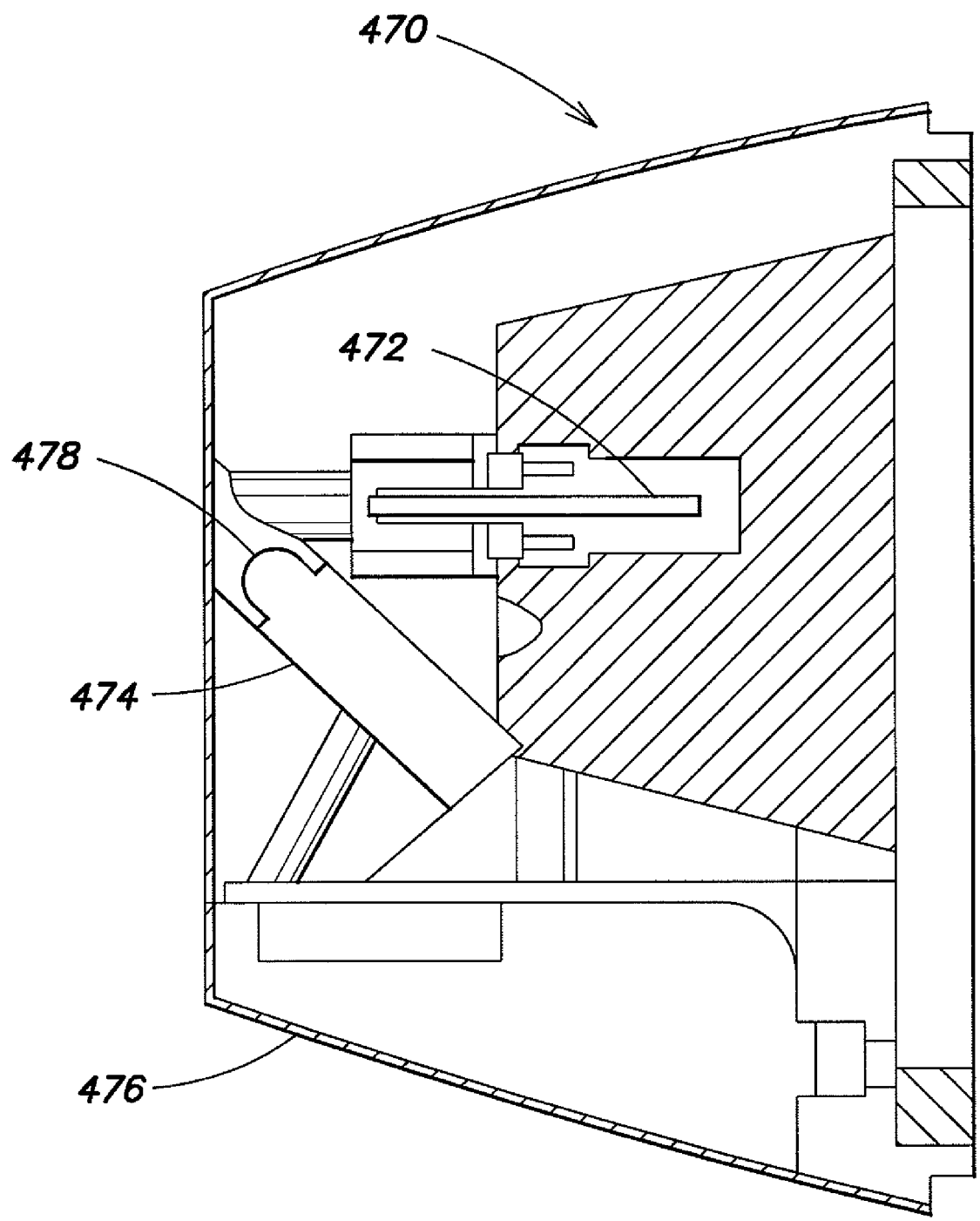
FIG. 4 illustrates a cross-sectional view of a reflectance probe in accordance with an embodiment of the invention.

FIG. 4 illustrates a cross section of an embodiment of a reflectance probe 470 that can be included in an embodiment of a hand-held IR spectrometer to facilitate the measurement of a sample. In particular, the breakaway view of FIG. 3B illustrates where the reflectance probe is situated in the hand-held spectrometer. The reflectance probe 470 includes an optical fiber 472, a light source 474 and a removable cover 476. In one embodiment, the light source is a model L1021 light bulb manufactured by Gilway.

According to one embodiment, the optical fiber 472 is secured to the reflectance probe 470 with a fiber connector (not illustrated) that screws into a sleeve that is held in place by a set-screw. This fiber configuration helps the assembly process by simplifying the attachment of the reflectance probe to the spectrometer body.

In order to maintain a relatively low level of power consumption by the IR spectrometer device, the reflectance probe 470 is designed to illuminate the sample (e.g., a sample of a solid material) with as much light as possible while minimizing the power consumption. According to one embodiment, the reflectance probe 470 of FIG. 4 is designed to place the light source 474 as close as possible to the sample so as to minimize the power consumption. According to some embodiments, the spectrometer is configured to measure a diffuse reflectance for a sample. In a version of this embodiment, the fiber 472, that is used to collect the light, is placed at an angle to the sample surface that is different than the angle of incidence of the light source to facilitate the diffuse reflectance measurement. In other embodiments, the spectrometer is configured to measure a specular reflection for the sample. In a version of this embodiment, the fiber is placed at an angle to the sample such that the angle of incidence of the light onto the sample and the angle of reflection for the light and fiber are substantially equal. According to some embodiments, the optical fiber 472 is a 600 um core multimode optical fiber configured normal to the sample area 478 as illustrated in FIG. 4. In a version of this embodiment, a lens, such as lens 114 of FIG. 1, is not required to optimize the light collection process.

In one embodiment of the reflectance probe 470 shown in FIG. 4, the light from the light source 474 is incident upon the sample area at 45 degrees to normal while the fiber 472 collecting the light is normal to the sample surface and sample area. The fiber 472 is to placed at a distance from the sample surface so that the full field of view of the fiber 472 is filled by the illuminated surface of the sample. This can be stated mathematically as:

$$x = d/NA \qquad \text{Eq. (1)}$$

where x is the distance from the fiber tip the sample surface, d is the diameter of the illuminated sample surface, and NA is the numerical aperture of the fiber 472. For the configuration shown, the light source 474 can provide excellent illumination of a spot several mm in diameter while consuming a little over 2 W in power. It is to be appreciated that the probe and the configuration of the light source and the optical fiber are configured to achieve low power consumption for reflectance measurements. In contrast, generally, light intensity is less of a problem for transmission measurements because light is not scattered from the sample as is the case with diffuse reflectance measurements and therefore less signal power is lost with a transmission measurement than a reflectance measurement.

FIGS. 5A-5C illustrate an embodiment of a hand-held IR spectrometer 580. This embodiment of the hand-held IR spectrometer 580 includes the optical module 360 as illustrated in FIG. 3 and the reflectance probe 470 as illustrated in FIG. 4. Referring to FIG. 5A, a side view of the hand-held IR spectrometer 580 is shown where the spectrometer 580 includes a handle 582 and a body 583. According to one embodiment, the power source (e.g., batteries) can be located in the handle 582 (see breakaway view of FIG. 3B) and a probe 581 (e.g., the reflectance probe 470) is located at an end of the body 583. In a version of this embodiment, the probe 581 includes a door 576 that provides access for changing the light source, e.g., replacing a light bulb. Further, in one embodiment, the hand-held IR spectrometer 580 includes an activation device 584, for example, a trigger that is used by an operator to begin the measurement (e.g., IR spectral analysis) of a sample. In various embodiments, the probe can be the previously described reflectance probe 581 or another type of probe such as transmission probe or a dip probe.

In one or more embodiments, the hand-held IR spectrometer 580 is configured in form factor so that it can be hand held at least in part because it is light in weight, where for example it weighs five pounds or less. In one embodiment the hand-held spectrometer is 3.7 lbs. Further, according to the power management aspects of one embodiment, the hand-held IR spectrometer 580 can provide five to eight hours of continuous operation. Further, to facilitate hand-held use the hand-held IR spectrometer 580 is sized to be easily maneuvered by a user. For example, in one embodiment, the hand-held IR spectrometer to 580 is 10 to 11 inches in length, 9 to 11.5 inches tall and 5.5 to 6 inches wide.

A top view of one embodiment of the hand-held IR spectrometer 580, illustrated in FIG. 5B, includes a view of a display 585 and a user interface 530. The user interface 530 may include a plurality of control elements 586A, 586B, 586C that when selected allow a user to navigate menus appearing in the display and to select items within the menus. In one embodiment, the display 585 is a color LCD display screen for displaying, for example, measurement results and menus for setting up the device and the operation of the controller (e.g., the controller 218). In another embodiment, the display 585 can be a touch screen that allows the user to select items appearing in the display by making contact with the region of the screen where the item appears. It is to be appreciated that other types of displays and user interfaces can be used and that the IR spectrometer need not include a display. An exploded view of another embodiment of a display and user interface is illustrated in FIG. 6.

A rear view of the hand-held IR spectrometer 580, illustrated in FIG. 5C, provides a view of a data interface 530 (e.g., a USB port), an indicating light 587, and an on/off switch 588. According to one embodiment, the data interface 530 is used to upload and download files. The indicating light may be used to indicate a variety of operating conditions of the hand-held IR spectrometer 580, for example, the on/off state of the spectrometer, the sampling state of the spectrometer, the state of the power source, and the like. In operation, in an embodiment employing a reflectance probe, a sample is placed in front of a hole located in front of the probe 581, and the activation device 584 may be selected by the user to take a spectral measurement of the sample. In one embodiment, the indicating light provides an indication at the completion of a measurement.

Embodiments of the spectrometer 580 can be used to sample solids, liquids or both solids and liquids with a performance that is comparable to bench-top IR spectrometers. For example, in one exemplary embodiment, the spectrometer 580 configured as discussed herein has the following operating specifications: a spectral range of 930-1690 nm; an absolute wavelength accuracy of ±0.6 nm, at a fixed temperature (with parabolic fit); a pixel spacing resolution of 8 nm; an optical resolution of 12 nm; a stray light level of less than 0.01% transmission of 10 mm water at 1445 nm using a Halogen lamp and a RGT 850 filter; a dynamic range of 10,000 single acquisition with optimum light levels; a photometric stability of better than 0.05% over 6 hours; a measurement time of less than 10 to milliseconds per spectral mask and less than 1 second per spectrum; a mini USB hardware interface; a 24 bit A/D converter; a power consumption of 5 Watts during measurements; a single InGaAs detector; an operating temperature range of −5 to 40 degrees C.; and a storage temperature range of −40 to +85 degrees C. The preceding specification is an example of one embodiment. Any one or any combination of the preceding specifications may vary in one or more embodiments of the invention. For example, the spectral range may be configured to be broader. One embodiment of a hand-held spectrometer has the following operating specifications: a spectral range of 1000-1600 nm and from 1600-2400 nm; a pixel spacing resolution of 6 nm at the first wavelength range and 8 nm at the second optical range; and an optical resolution of 8 nm at the first wavelength range and 12 nm at the second wavelength range.

Further, embodiments of the hand-held IR spectrometer 580 may include a wireless interface and/or a built-in wavelength reference integral to the spectrometer 580.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An IR spectrometer comprising:
a light source configured to illuminate a sample with light;
a grating configured to spectrally disperse the light that has illuminated the sample to provide a dispersed light;
a controller;
a MEMS array configured to be actuated to control a diffraction of the dispersed light to provide a plurality of wavelengths of light, the MEMS array comprising a plurality of individually controllable diffractive elements;
a switched voltage array responsive to the controller and coupled to the MEMS array, the switched voltage array comprising a plurality of switched voltage sources configured to selectively turn the individually controllable diffractive elements of the MEMS array optically-on and optically-off responsive to the controller to diffract the plurality of wavelengths of light according to a hadamard matrix; and
a detector configured to detect the plurality of wavelengths of light;
wherein the controller includes a power management system adapted to control the MEMS array to manage a power consumption of the MEMS array; and
wherein the controller is further configured to control the switched voltage array and the MEMS array such that the IR spectrometer is operated as a hadamard transform spectrometer.

2. The IR spectrometer of claim 1, wherein the controller and the MEMS array are configured to control the MEMS array to draw substantially zero current when the MEMS array is in a static state.

3. The IR spectrometer of claim 1, further comprising a probe that includes the light source.

4. The IR spectrometer of claim 3, wherein the probe is configured to provide the light to the sample and receive the light from the illuminated sample.

5. The IR spectrometer of claim 1, further comprising a lithium ion battery power source.

6. The IR spectrometer of claim 1, wherein the IR spectrometer comprises a connector configured to connect to an AC power cord.

7. The IR spectrometer of claim 1, wherein the detector includes a single photodiode detector.

8. The IR spectrometer of claim 7, wherein the detector further includes a transimpedance amplifier and an Analog to Digital converter.

9. The IR spectrometer of claim 1, further comprising a housing sized and arranged to be held in a hand and to house the light source, the grating, the MEMS array, the controller, and the detector.

10. The IR spectrometer of claim 1, wherein the controller is configured to identify the sample material from the light that is reflected from the sample.

11. The IR spectrometer of claim 1, further comprising a data interface coupled to the controller and wherein the controller and data interface are configured to transfer data from the spectrometer to a remote processor.

12. The IR spectrometer of claim 1, wherein the spectrometer is configured to operate over a wavelength range of less than about 2400 nm.

13. The IR spectrometer of claim 1, further comprising:
a driver circuit, responsive to the controller, the driver circuit configured to control an operation of the light source to minimize a power consumption of the light source;
wherein the controller controls the driver circuit so that the power consumption of the light source is less than 3 Watts.

14. An IR spectrometer comprising:
a light source configured to illuminate a sample with light;
a grating configured to spectrally disperse the light that has illuminated the sample to provide a dispersed light;
a controller;
a MEMS array adapted to be actuated by the controller to control a diffraction of the dispersed light to provide a plurality of wavelengths of light; and
a detector configured to detect the plurality of wavelengths of light, the detector comprising a single photodiode detector;
wherein the controller is adapted to control the MEMS array so as to manage a power consumption of the MEMS array, and is further adapted to control the MEMS array so as to diffract the plurality of wavelengths of light; and
wherein the detector is configured to be cooled with less than one watt of power.

15. An IR spectrometer comprising:
a light source configured to illuminate a sample with light;
a grating configured to spectrally disperse the light that has illuminated the sample to provide a dispersed light;
a controller;
a MEMS array configured to be actuated to control a diffraction of the dispersed light to provide a plurality of wavelengths of light, the MEMS array comprising a plurality of individually controllable diffractive elements;
a switched voltage array responsive to the controller and coupled to the MEMS array, the switched voltage array comprising a plurality of switched voltage sources configured to selectively turn the individually controllable diffractive elements of the MEMS array optically-on and optically-off responsive to the controller to diffract the plurality of wavelengths of light; and
a detector configured to detect the plurality of wavelengths of light, the detector comprising a single photodiode detector;
wherein the controller includes a power management system configured to control the operation of at least the MEMS array and the light source of the IR spectrometer so that an average power consumption of the IR spectrometer when in use is less than 5 Watts.

16. The IR spectrometer of claim 15, wherein the controller is configured to control the MEMS array such that the spectrometer is adapted to be operated as a scanning monochromator.

17. The IR spectrometer of claim 15, wherein the controller is configured to control the MEMS array such that the spectrometer is adapted to be operated as a filter-wheel spectrometer.

18. A hand-held IR spectrometer comprising:
a light source configured to illuminate a sample with light;
a grating configured to spectrally disperse the light that has illuminated the sample to provide a dispersed light;
a controller;
a MEMS array configured to be actuated to control a diffraction of the dispersed light to provide a plurality of wavelengths of light, the MEMS array comprising a plurality of individually controllable diffractive elements;
a MEMS driver circuit responsive to the controller and coupled to the MEMS array, the MEMS driver circuit configured to selectively turn the individually controllable diffractive elements of the MEMS array optically-on and optically-off responsive to the controller to diffract the plurality of wavelengths of light; and
a detector configured to detect the plurality of wavelengths of light, the detector comprising a single photodiode detector;
a housing sized and arranged to be held in a hand and to house the light source, the grating, the MEMS array, the MEMS driver circuit, the controller, and the detector;
wherein the controller is adapted to control the MEMS array to manage a power consumption of the MEMS array; and
wherein the hand-held IR spectrometer is configured to weigh less than 5 pounds.

19. The IR spectrometer of claim 18, wherein the MEMS driver circuit comprises a switched voltage array comprising a plurality of switched voltage sources configured to selectively turn the individually controllable diffractive elements of the MEMS array optically-on and optically-off responsive to the controller to diffract the plurality of wavelengths of light.

20. The IR spectrometer of claim 18, wherein the controller is configured to control the MEMS driver circuit to actuate the MEMS array such that the spectrometer is adapted to be operated as one of a filter-wheel spectrometer, a scanning monochromator; and a hadamard transform spectrometer.

* * * * *

UNITED STATES PATENT AND TRADEMARK OFFICE
CERTIFICATE OF CORRECTION

PATENT NO. : 7,791,027 B2
APPLICATION NO. : 12/631574
DATED : September 7, 2010
INVENTOR(S) : Abraham McAllister et al.

It is certified that error appears in the above-identified patent and that said Letters Patent is hereby corrected as shown below:

Title Page (item 57) in abstract, line 12, "to" should be deleted.

In column 2, line 36, "to" should be deleted.

In column 3, line 18, "to to" should be replaced with --to--.

In column 5, line 17, "one to" should be replaced with --one--.

In column 6, line 45, "to" should be deleted.

In column 7, line 27, "to" should be deleted.

In column 9, line 29, "to" should be deleted.

In column 10, line 8, "to" should be deleted.

In column 12, line 16, "to" should be deleted.

In column 12, line 66, "spectrometer to 580" should be replaced with --spectrometer 580--.

In column 13, line 46, "to" should be deleted.

Signed and Sealed this

Twenty-first Day of December, 2010

David J. Kappos
*Director of the United States Patent and Trademark Office*